United States Patent [19]

Nishiyama et al.

[11] Patent Number: 4,866,657
[45] Date of Patent: Sep. 12, 1989

[54] ADDER CIRCUITRY UTILIZING REDUNDANT SIGNED DIGIT OPERANDS

[75] Inventors: Tamotsu Nishiyama; Shigeo Kuninobu, both of Osaka; Naofumi Takagi, Kyoto; Takashi Taniguchi, Osaka, all of Japan

[73] Assignee: Matsushita Electric Industrial Co., Ltd., Kadoma Osaka, Japan

[21] Appl. No.: 86,967

[22] Filed: Aug. 18, 1987

Related U.S. Application Data

[63] Continuation-in-part of Ser. No. 66,817, Jun. 25, 1987, and a continuation-in-part of Ser. No. 70,565, Jul. 7, 1987, and a continuation-in-part of Ser. No. 74,892, Jul. 17, 1987, and a continuation-in-part of Ser. No. 74,971, Jul. 17, 1987.

[30] Foreign Application Priority Data

Aug. 19, 1986 [JP] Japan ............................... 61-193204
Feb. 12, 1987 [JP] Japan ............................... 62-30326

[51] Int. Cl.$^4$ .................................................. G06F 7/49
[52] U.S. Cl. .................................................. 364/768
[58] Field of Search ........................ 364/768, 784, 786

[56] References Cited

PUBLICATIONS

Avizienis, "Binary-Compatible Signed-Digit Arithmetic", *Proceedings—Fall Joint Computer Conf.*, 1964, pp. 663–672 364/768.
A VLSI-Oriented High-Speed Divider Using Redundant Binary Representation, Takagi et al., IECE Japan, vol. 167 D, #4, pp. 450–457, 4/84.
A VLSI-Oriented High-Speed Multiplier Using Redundant Binary Adder Tree, Takagi et al., IECE Japan, vol. J66.d, pp. 683–690, 6/84.
A New Class of Digital Division Methods, James Robertson, IRE Transactions on Electronic Computers, pp. 218–222, 9/58.
Signed-Digit Number Representations for Fast Parallel Arithmetic, Avizienis, IRE Transactions on Electronic Computers, pp. 389–400, 9/61.
A Class of Binary Divisions Yielding Minimally Represented Quotients Metze IRE Transactions on Electronic Computers, pp. 761–764, 12/62.
Design of the Arithmetic Units of ILLIAC III, Redundancy & Higher Radix Methods, Atkins, IEEE Transacts. on Computers, vol. C-19, pp. 720–732, 8/70.
Multiple Operand Addition and Multiplication, Shanker Singh et al., IEEE Transactions on Computers, vol. C-22, No. 2, pp. 113–120, 2/73.
Concise Papers, Lyon, IEEE Transactions on Communications, pp. 418–425, 4/76.
Real-Time Processing Gains Ground with Fast Digital Multiplier, Waser et al., Electronics, pp. 93–99, 9/77.
High Speed Multiplier Using a Redundant Binary Adder Tree, Harata et al., IEEE International Conference on Computer Design, pp. 165–170, 1984.
High Speed VLSI Multiplication Algorithm with a Redundant Binary Addition Tree, Takagi et al., IEEE Transactions on Computers, vol. C-34, No. 9, pp. 1789–1795, 9/85.
Design of High Speed MOS Multiplier and Divider Using Redundant Binary Representation, Kuninobu et al., Proceedings 8th Symposium on Computer Arithmetic, pp. 80–86, 5/87.

*Primary Examiner*—David H. Malzahn
*Attorney, Agent, or Firm*—Amster, Rothstein & Ebenstein

[57] ABSTRACT

A high speed arithmetic processor and adder circuitry thereof are disclosed in which carry (borrow) propagation is never more than one digit. Addition (or subtraction) are performed by: (a) determining an intermediate carry (or borrow) at the i-th order position and an intermediate sum (or difference) at the i-th order position from the addend (or subtrahend) and the augend (or minuend) and (b) determining the sum (or difference) of the intermediate sum (or difference) at the i-th order position and the intermediate carry (or borrow) at the (i−1)-th or next-lower-order position. Logic equations, truth tables and circuitry are disclosed for implementing several embodiments of the invention.

20 Claims, 5 Drawing Sheets

ADDER CIRCUITRY UTILIZING REDUNDANT SIGNED DIGIT OPERANDS

RELATED APPLICATIONS

This is a continuation-in-part of application Ser. No. 066,817 filed June 25, 1987 entitled "Arithmetic Processor Using Redundant Signed Digit Arithmetic", application Ser. No. 070,565 filed July 7, 1987 entitled "Arithmetic Processor and Divider Using Redundant Signed Digit Arithmetic", application Ser. No. 074,892 filed July 17, 1987 entitled "Arithmetic Processor and Divider Using Redundant Signed Digit Arithmetic", application Ser. No. 074,971 filed July 17, 1987 entitled "Arithmetic Processor And Multiplier Using Redundant Signed Digit Arithmetic", the disclosure of which are incorporated herein by reference.

BACKGROUND OF THE INVENTION

The present invention relates to an arithmetic processor and, more particularly, to a high speed arithmetic processor capable of internal addition and subtraction, and to adder circuitry thereof, which may be implemented by LSI.

High-speed adders are discussed in the Collected Papers for the 1986 National Congress of IECE Japan, Vol. 2, p. 187, 1986; high-speed multipliers, in IEEE Trans. Comput., Vol. C-34, No. 9, Sept. 1985, pp. 789–796, and Trans. of IECE Japan, Vol. J66-D, No. 6, pp. 684–690, 1983; and high-speed dividers, in Trans. of IECE Japen, Vol. J67-D, No. 4 pp. 450–457, 1984. The arithmetic units of those adders, multipliers and dividers perform addition, multiplication, and division with combinational circuitry by using the redundant binary representation (a king of signed digit ("SD") expression) which express each digit with elements from the set $\{-1, 0, 1\}$. As a result, addition can be performed within a constant time regardless of the number of digits of the operands, and such arithmetic units have increassed processing speeds and a regular array structure as compared with other arithmetic units.

In conventional high-speed arithmetic circuits, multiplication or division is carried out using ECL logic elements which are capable of performing both NOR and OR functions, and addition is carried out using a selector circuit which implements the exclusive OR gate and transfer gates using CMOS as combinational circuitry. However, the gate count, and correspondingly the number of transistors, for such circuits is high, there being about 60 transistors in a cell for a redundant binary adder, compared with about 30 transistors in a cell for a binary adder. Such arithmetic circuits have the following disadvantages: (1) the number of circuit elements increases enormously with the number of arithmetic digits to be processed; and (2) the number of stages required for each cell of an addition circuit is large.

OBJECTS AND SUMMARY OF THE INVENTION

It is an object of the present invention to provide a high speed arithmetic processor and adder circuitry thereof which avoid the problems described above.

It is another object of the present invention to provide a high speed arithmetic processor and adder circuitry thereof having a regular structure utilizing combinational circuitry and signed digit expressions for internal addition and subtraction.

It is another object of the present invention to reduce the number of elements (e.g., transistors) in an arithmetic processor (e.g., by up to 70% to 80% of the transistors required in prior art arithmetic processors).

It is another object of the present invention to provide an arithmetic processor which may be fabricated on an LSI chip.

It is another object of the present invention to provide an arithmetic processor of simplified circuit structure.

It is another object of the present invention to provide an arithmetic processor which prevents carry-propagation in arithmetic addition and subtraction.

The above and other objects are achieved by executing addition (or subtraction) in arithmetic operations in an arithmetic processor in two arithmetic steps as follows: (a) determining the intermediate carry (or borrow) $c_i$ at the i-th order position and an intermediate sum (or difference) digit s at the i-th order position from the addend (or subtrahend) and the augend (or minuend); and (b) determining the sum $s_i + c_{i-1}$ (or difference $s_i - c_{i-1}$ of the intermediate sum digit s at the i-th order position and the intermediate carry $c_{i-1}$ from the next-lower-order position, that is, the (i−1)-th order position. Intermediate carry $c_{i-1}$ corresponds to intermediate carry $c_i$, but is from the next-lower-order position, i.e., intermediate carry c is at the i-th order and intermediate carry $c_{i-1}$ is at the (i−1)-th order position. In accordance with the invention, a processor is provided which includes: at every i-th order position of addition (or subtraction), first means to determine a binary signal $p_{i-1}$ expressing the combination of states of the digits at the (i−1)-th order position of the addend and at the (i−1)-th order position of the augend; second means, which receives the digits at the i-th order position of the addend and at the i-th order position of the augend and the signal $p_{i-1}$, and provides a binary signal $u_i$ determined by the difference $p_{i-1} - s_i$ or sum $p_{i-1} + s_1$ between the signal $p_{i-1}$ and the intermediate sum (or difference) digit $s_i$ third means, which receives the digits at the (i−1)-th order position of the addend and at the (i−1)-th order position of the augend and a signal $p_{i-2}$ corresponding to the signal $p_{i-1}$ but set by the first means at the (i−2)-th order position, and provides a binary signal $v_{i-1}$ determined by the sum $p_{i-1} + c_{i-1}$ (or difference $p_{i-1} - c_{i-1}$) of the signal $p_{i-1}$ and the intermediate carry $c_{i-1}$; and fourth means, which receives the signals $u_i$ and $v_{i-1}$, and from only those signals provides a final sum (or difference) for the i-th order position of the intermediate sum (or difference) digit s at the i-th order position and the intermediate carry (or borrow) $c_{i-1}$ from the i−1)-th order position.

According to another embodiment, the arithmetic processor comprises a first circuit which receives signals representing the digits of an augend and an addend at the i-th order position thereof and provides a binary signal $p_i$ representing the combination of states of the digits; a second circuit which receives the signals representing the digits at the i-th order position of the augend and the addend and a binary signal $p_{i-1}$ corresponding to the binary signal $p_i$ but from the next-lower-order or (i−1)-th position and provides a signal $v_i$ representing the sum $p_i - \underline{c_i}$ ($c_i + p_i$) of a carry $c_i$ from the i-th order position and $\overline{p_i}$ which is the logical inverse of the signal $p_i$; a third circuit which receives the signals representing the digits at the i-th order position of the augend and the added and the binary signal $p_{i-1}$ and provides a signed-digit sum signal $u_i$ comprising at least one binary signal which represents the sum $s_i+p_{i-1}$ of an intermediate sum digit $s_i$ at the i-th order position and the binary signal $p_{i-1}$; and a fourth circuit which receives a binary signal $v_{i-1}$ at the (i−1)-th order position corresponding to the signal $v_i$ output from the second circuit but at the next-lower-order position and the signed-digit signal $u_i$, and provides a signed-digit signal expressing the sum digit $s_i+c_{i-1}$ of the intermediate sum $s_i$ at the i-th order position and a carry $c_{i-1}$ which corresponds to the carry $c_i$ but at the (i−1)-th order position.

An intermediate sum digit (or difference) and an intermediate carry (or borrow) are referred to by $s_i$ and $c_i$, respectively, for the i-th order position. Lower order positions for the intermediate sum (or difference) digit and intermediate carry (or borrow) are represented by $s_{i-1}$ and $c_{i-1}$, respectively, $s_{i-2}$ $c_{i-2}$, respectively, etc. Also, an intermediate sum (or difference) digit and intermediate carry (or borrow) are represented by other letters such as k (intermediate carry), to distinguish between different order positions of an intermediate sum (or difference) digit and intermediate carry (or borrow).

The present invention employs the use of the signed digit ("SD") expression to express internal operands in internal arithmetic operations. Each digit of such internal operands is represented by zero, a positive integer or a negative integer corresponding to the positive integer. That is, each digit is represented by an element from the set $\{-1, 0, 1\}$, $\{-2, -1, 0, 1, 2\}$ and $\{-N, \ldots, -1, 0, 1, \ldots, N\}$, and has redundancy so that one number can be represented in a number of ways. In addition (or subtraction), the intermediate carry (or intermediate borrow) and the intermediate sum digit (or intermediate difference) digit can be determined so that, even when there is a carry (or borrow) from the next-lower-order position, the sum (or difference) of the intermediate sum digit (or intermediate difference) digit and the intermediate carry (or intermediate borrow) from the next-lower-order-position is only a single digit. This prevents carry (or borrow) propagation in addition (or subtraction), and allows parallel addition (or subtraction) to be performed by means of combinational circuitry in a constant time period regardless of the number of digits of the operands. For example, using the SD expression (which is a redundant binary representation) to express each digit as an element from the set $\{-1, 0, 1\}$, in the addition (or subtraction) operation, a carry (or borrow) propagation is never more than 1 digit. This is discussed in Trans. of IECE Japan, Vol. J67-D, No. 4, pp. 450–457, 1984 and Trans. of IECE Japan, Vol. J66-D, No. 6, pp. 683–690, 1983.

An adder in accordance with an embodiment of the invention is described below in connection with use of redundant binary numbers for the addend and augend. Table 1 below sets forth rules for addition in accordance with the invention in which the carry propagation no more than one digit in the redundant binary representation.

TABLE 1

| Type | Augend ($x_i$) | Addend ($y_i$) | Next-lower-order position ($x_{i-1}, y_{i-1}$) | Carry ($c_i$) | Intermediate Sum ($s_i$) |
|---|---|---|---|---|---|
| (1) | 1 | 1 | — | 1 | 0 |
| (2) | 1 | 0 | Both are nonnegative | 1 | −1 |
| (3) | 0 | 1 | At least either one is negative | 0 | 1 |
|  | 0 | 0 |  |  |  |
|  | 1 | −1 |  |  |  |
| (4) | −1 | 1 | — | 0 | 0 |
| (5) | 0 | −1 | Both are nonnegative | 0 | −1 |
|  | −1 | 0 | At least either one is negative | −1 | 1 |
| (6) | −1 | −1 | — | −1 | 0 |

The addition rules set forth in Table 1 define that the sum digit of the intermediate sum $s_i$ at the i-th order position and the intermediate carry $c_{i-1}$ from the next-lower-order position never generates a carry. (Although "c", "$c_i$", etc., are used herein to indicate a carry, k may also be used to indicate a particular carry such as from the next-lower-order or (i−1)-th order position.) Therefore, a relationship between the intermediate sum digit $s_i$ and the intermediate carry $c_{i-1}$ from the next-lower-order position is always established so that one of them is nonnegative and the order is nonpositive, i.e., the relationship is either that $s_i$ is nonnegative and $c_{i-1}$ is nonpositive or that $s_i$ is nonpositive and $c_{i-1}$ is nonnegative. This makes it possible to convert the intermediate sum digit $s_i$ and the intermediate carry $c_{i-1}$ into a "0" or "1" signal.

According to the invention, the first means referred to above sets the signal $p_{i-1}$ to "0" when both of the digits at the (i−1)-th order position of the addend and at the (i−1)-th order position of the augend are nonnegative, and sets the signal $p_{i-1}$ to "1" when at least one of those digits is negative; the third means referred to above determines the binary signal $v_{i-1}$ representing the sum $p_{i-1}+c_{i-1}$ or its logical negation (inverse); the second means referred to above determines the binary signal $u_i$ representing the difference $p_{i-1}-s_i$ or its logical negation (inverse); and the forth means referred to above determines the final sum of the intermediate carry $c_{i-1}$ from the (i−1)-th order position and the intermediate sum digit $s_i$ at the i-th order position from only the binary signals $v_{i-1}$ and $u_i$. The foregoing enables the circuit construction of the adder to be simplified.

If the first means is modified to satisfy the equation $p_{i-1}=1$ when both of the digits at the (i−1)-th order position of the addend and at the (i−1)-th order position of the augend are nonnegative, and to satisfy $p_{i-1}=0$ when at least one of the digits is negative, then the binary signal $v_{i-1}$ representing the difference $p_{i-1}-c_{i-1}$ or its logical negation (inverse) is determined by the third means, and the binary signal $u_i$ representing the sum of $p_{i-1}+s_i$ or its logical negation (inverse) is determined by the second means.

Alternatively, when either the addend or the augend is a redundant binary number in which the digits in all positions are nonnegative (or nonpositive), i.e., a binary number, the signal $p_{i-1}$ can be omitted, and then the binary signal $v_{i-1}$ representing the value $c_{i-1}$ (or 1-$c_{i-1}$) or its logical negation (inverse) is determined by the third means, and the binary signal $u_i$ representing the value of $-s_i$ (or $1+s_i$) or its logical negation (inverse) is determined by the second means.

In accordance with the invention, the number of gates for each adder can be held to a small number of unnecessary signal wires eliminated, which enables the circuit structure of each adder to be simplified, and a high-speed arithmetic processor to be easily implemented by LSI.

BRIEF DESCRIPTION OF THE DRAWINGS

FIG. 3 is a schematic circuit diagram of a third embodiment of an adder according to the invention.

DESCRIPTION OF THE PREFERRED EMBODIMENTS

Figure 1:
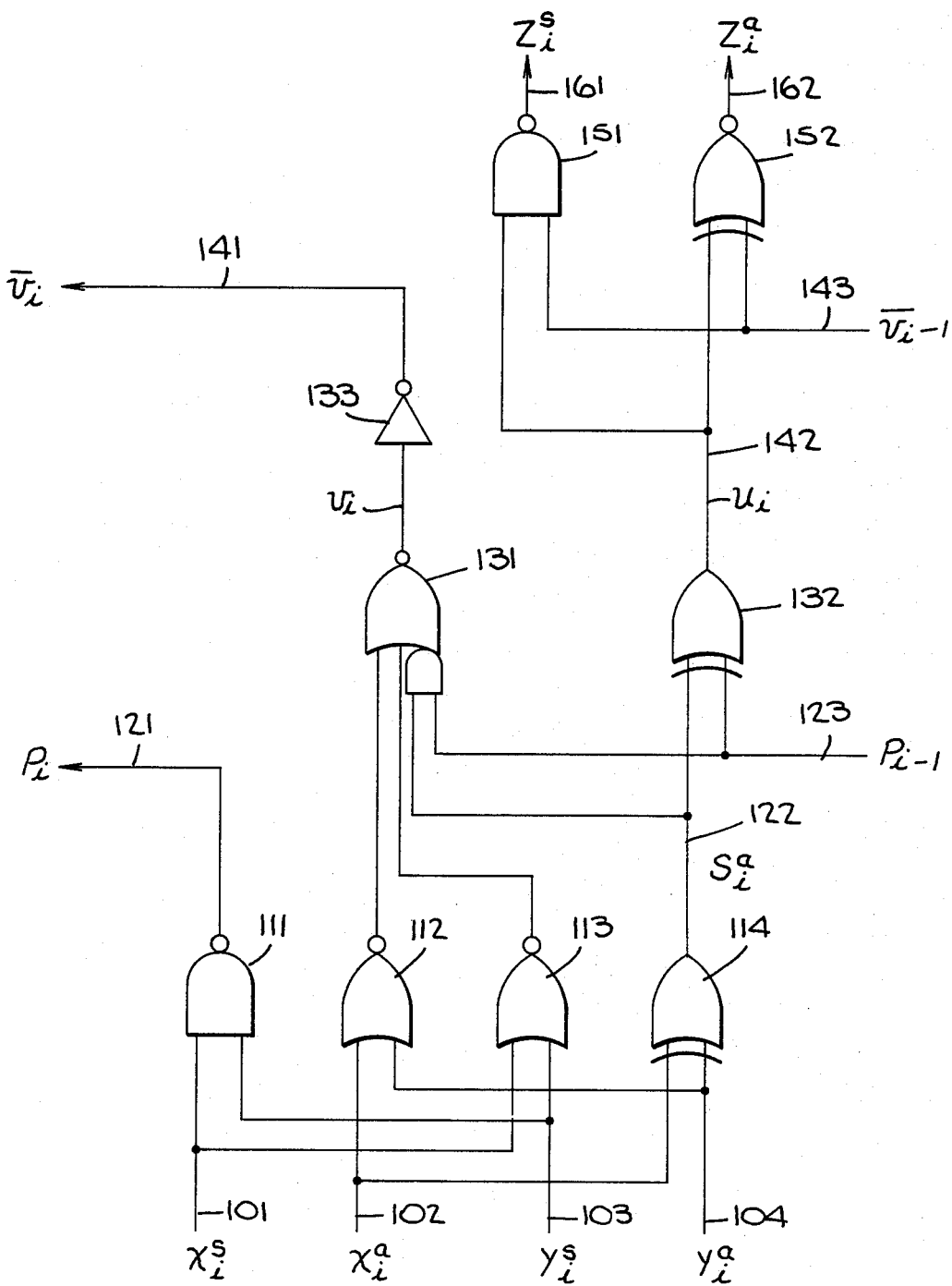
FIG. 1 is a schematic circuit diagram of a first embodiment of an adder according to the invention.

A first embodiment following the addition rules of Table 1, in which the carry can not propagate beyond one digit, is depicted in FIG. 1. In redundant addition using the addition rules of Table 1, the intermediate sum digit and intermediate carry in the redundant binary representation are converted into the binary expression in accordance with the following.

The addition rules of Table 1 vary in accordance with particular combinations of the states of digits in the next-lower-order position of the addend and the augend. A signal $p_i$ representing a combination of states of digits at the i-th order position of the addend and augend is obtained according to a rule which defines $p_i=0$ when both digits at the i-th order position of the addend and augend are nonnegative (i.e., when the intermediate carry from the i-th order position is nonnegative, and the intermediate sum digit at the (i+1)-th order position is nonpositive), and which defines $p_i=1$ when at least one of the digits is negative (i.e., when the intermediate carry from the i-th order position is nonpositive and the intermediate sum digit at the (i+1)-th order position is nonnegative). Next, an intermediate sum digit at the i-th order position defined as $s_i$ and the intermediate carry from the (i−1)-th order position defined as $c_{i-1}$ are converted into the binary signals $u_i$ and $v_{i-1}$, respectively, by means of the equations below;

$$u_i = p_{i-1} - s_i$$

$$v_{i-1} = p_{i-1} + c_{i-1};$$

where $s_i$ and $c_{i-1}$ are expressed as digits of redundant binary numbers and may have a value from the set $\{-1, 0, 1\}$; $u_i$, $v_{i-1}$ and $p_{i-1}$ are binary numerals and may have a value from the set $\{0,1\}$; and the suffix i−1 represents the position of the next lower position from the i-th order position, i.e., the (i−1)-th order position. For simplicity, hereinafter, $u_i$ designates a signal representing an intermediate sum digit at the i-th order position, and $v_{i-1}$, designates a signal representing an intermediate carry from the (i−1)th order position.

Addition rules for $u_i$ and $v_i$ are determined as follows. When $p_{i-1}$ is 0, i.e., when both the addend $y_{i-1}$ and the augend $x_{i-1}$ are nonnegative, $u_i$ is determined in accordance with Table 2, and $v_i$ is determined in accordance with Table 3. Alternatively, when $p_{i-1}$ is 1, i.e., when at least one of the addend $y_{i-1}$ and the augend $x_{i-1}$ is negative, $u_i$ is determined in accordance with Table 4 and $v_i$ is determined in accordance with Table 5. When both the addend $y_i$ and the augend $x_i$ at the i-th order position are nonnegative, $p_i$ is "0" and when either $x_i$ or $y_i$ is negative, $p_i$ is "1".

TABLE 2

|  | | Augend ($x_j$) | |
|---|---|---|---|
|  |  | −1 | 0 | 1 |
| Addend ($y_i$) | −1 | 0 | 1 | 0 |
|  | 0 | 1 | 0 | 1 |
|  | 1 | 0 | 1 | 0 |

TABLE 3

|  | | Augend ($x_j$) | |
|---|---|---|---|
|  |  | −1 | 0 | 1 |
| Addend ($y_i$) | −1 | $p_i$ | $p_i$ | $\overline{p_i}$ |
|  | 0 | $p_i$ | $\overline{p_i}$ | $\overline{p_i}$ |
|  | 1 | $p_i$ | $p_i$ | $p_i$ |

TABLE 4

|  | | Augend ($x_j$) | |
|---|---|---|---|
|  |  | −1 | 0 | 1 |
| Addend ($y_i$) | −1 | 1 | 0 | 1 |
|  | 0 | 0 | 1 | 0 |
|  | 1 | 1 | 0 | 1 |

TABLE 5

|  | | Augend ($x_j$) | |
|---|---|---|---|
|  |  | −1 | 0 | 1 |
| Addend ($y_i$) | −1 | $\overline{p_i}$ | $p_i$ | $p_i$ |
|  | 0 | $p_i$ | $p_i$ | $\overline{p_i}$ |
|  | 1 | $p_i$ | $p_i$ | $p_i$ |

In the tables $\overline{p_i}$ represents the logical negation or inverse of $p_i$ (i.e.), if $p_i=0$ then $\overline{p_i}=1$; and if $p_i=1$, the $\overline{p_i}=0$).

According to the first embodiment of the invention, the conversion from redundant binary numbers of the augend $x_i$, addend $Y_i$, and sum $z_i$ into binary signals is performed as follows.

The digits at the i-th order position of redundant binary numbers $x_i$, $y_i$ and $z_i$ are expressed as 2-bit signals $x_i^s x_i^a$; $y_i^s y_i^a$; and $z_i^s z_i^a$, respectively; redundant binary numbers are represented by 2-bit signals; for example, "−1" is represented by "01", "0" is represented by "10"; and "1" is represented by "11"; and $x_i$ is expressed as a 2-bit binary signal by $x_i^s x_i^a$ as shown in Table 6, where $x_i^s$ is a signal representing the sign part of $x_i$, and $x_i^a$ is a signal representing the magnitude (absolute value) of $x_i$.

TABLE 6

| $x_i$ | $x_i^s$ | $x_i^a$ |
|---|---|---|
| −1 | 0 | 1 |
| 0 | 1 | 0 |
| 1 | 1 | 1 |

When redundant binary numbers are converted into binary signals, the combination of states status signal $p_i$ of the addend and augend, the absolute value $s_i^a$ of the intermediate sum digit the signal $u_i$ representing the intermediate digit sum and the signal $v_i$ representing the intermediate carry can be determined respectively by the following logic equations.

$$p_i = x_i^s + y_i^s$$

$$s_i^a = x_i^a \oplus y_i^a$$

$$u_i = s_1^a \oplus p_{i-1}$$

$$v_i = (s_i^a \cdot p_{i-1}) \cdot (x_i^s + y_i^s) \cdot (x_i^a + y_i^a).$$

Moreover, the final sum $z_i$ can be obtained from a 2-bit signal $z_i^s z_i^a$ defined by the following logic equations.

$$z_i^s = u_i + v_{i-1}$$

$$z_i^a = u_i \oplus v_{i-1},$$

where, ".", "+", and "$\oplus$" are operators representing the logical product (AND), the logical sum (OR) and the exclusive logical sum (EX-OR) respectively, and $\overline{x_i^s}$, $\overline{y_i^s}$ and $\overline{s_i^a \cdot p_{i-1}}$ are logical negations (inverses) of $x_i^s$, $y_i^s$ and $s_i^a \cdot p_{i-1}$, respectively.

FIG. 1 depicts an adder in accordance with the invention implementing the first embodiment of the invention described above.

In FIG. 1: gates 111 and 151 are NAND gates; gates 112 and 113 are NOR gates; gates 114 and 132 are exclusive OR gates; gate 152 is an exclusive NOR gate; gate 133 is an inverter; and gate 131 is an AND-NOR composite gate.

Signals 101 ($x_i^s$) and 102 ($x_i^a$) form a 2-bit signal expressing the digit $x_i$ at the i-th order position, which is the augend represented as a redundant binary number. Signals 103 ($y_i^s$) and 104 ($y_i^a$) form a 2-bit signal expressing the digit $y_i$ at the i-th order position, which is the addend, represented by a redundant binary number. Signal 121 is a 1-bit signal representing the combination of states status signal $p_i$ of the addend and the augend at the i-th order position. Signal 123 is a 1-bit signal representing the combination of states status signal $p_{i-1}$ of the addend and the augend at the (i−1)th order position. Signal 122 is a 1-bit signal $s_i^a$ expressing the absolute value of the intermediate sum digit at the i-th order position. Signal 141 ($\overline{v_i}$) is the logical negation or inverse of the signal $v_i$ which represents the intermediate carry from the i-th order position. Signal 143 ($\overline{v_{i-1}}$) is the logical negation or inverse of the signal $v_{i-1}$ which represents the intermediate carry from the (i−1)-th order position. Signal 142 ($u_i$) representing the intermediate sum digit at the i-th order position. Output signals 161 ($z_i^s$) and 162 ($z_i^a$) form a 2-bit signal representing the digit $z_i$ of the final sum at i-th order position.

In FIG. 1, NAND gate 111 determines signal 121 ($p_i$) which indicates whether or not both of the digits $x_i$, $y_i$ at the i-th order position of the augend and the addend are nonnegative. The circuit composed of NOR gates 112 and 113, exclusive OR gate 114 and composite gate 131 determines signal $v_i$ representing the intermediate carry from the i-th order position. The circuit composed of exclusive OR gates 114 and 132 determines signal 142 ($u_i$) representing the intermediate sum digit at the i-th order position. In particular, exclusive OR gate 114 determines the absolute value $s_i^a$ (signal 122) of the intermediate sum from the magnitude (i.e., absolute value) $x_i^a$ (signal 102) of the digit at the i-th order position of the augend and the magnitude $y_i^a$ (signal 104) of the digit at the i-th order position of the addend. Exclusive OR gate 132 operates in accordance with the states of the addend and the augend at the next-order position (represented by signal $p_{i-1}$) to satify the conditions below:

if $p_{i-1} = 0$, then $u_i = 0 \oplus s_i^a$, that is $u_i = s_i^a$; and if $p_{i-1} = 1$, then $u_i = 1 \oplus s_i^a$, that is, $u_i = \overline{s_i^a}$ The equations $0 \oplus s_i^a = s_i^a$ and $1 \oplus s_i^a = \overline{s_i^a}$ can be easily determined. Moreover, the circuit composed of NAND gate 151 and exclusive NOR gate 152 determines the final sum $z_i^s$ (signal 161) and $z_i^a$ (signal 162) at the i-th order position from the signal $u_i$ expressing the intermediate sum digit and the logical negation $\overline{v_{i-1}}$ of the signal expressing the intermediate carry from the next-lower-order position. Here all signals 121, 122, 123, 141, 142 and 143 are 1-bit binary signals.

As to $v_i$ it can be determined from the following logical equation:

$$v_i = s_i^a \cdot p_{i-1} + (x_i^s + y_i^s) \cdot x_i^a \cdot y_i^a.$$

According to a second embodiment, which is a modified version of the first embodiment, either the augend or the addend is a redundant binary number and the other is a redundant binary number in which all the digits are nonnegative (which can be considered a binary number, and is hereinafter referred to simply as a binary number). In this embodiment, the augend is defined as a redundant binary number; the addend is defined as a binary number; $x_i$ may be have a value from the set $\{-1, 0, 1\}$; and $y_i$ may have a value from the set $\{0, 1\}$. Then, the intermediate carry at any position is always nonnegative and the intermediate sum digit is always nonpositive. In the first embodiment, this means that $p_i$ is always 0.

For the intermediate sum digit $s_i$ at the i-th order position and the intermediate carry $c_{i-1}$ (i=1, 2, ..., n) at the (i−1)-th order position, the signals $u_i$ and $v_{i-1}$ are defined by the equations below;

$$u_i = -s_i$$

$$v_{i-1} = c_{c-1},$$

where $s_i$ is a nonpositve redundant binary number, and $c_{i-1}$ is a nonnegative redundant binary number.

The addition rule for $u_i$ and $v_i$ is as follows. Since for all i's, $p_i$ is always 0, as seen from Tables 2 and 3, $u_i$ is determined according to Table 7, and $v_i$ is determined in accordance with Table 8. Tables 7 and 8 are derived from Tables 2 and 3, respectively, in which $p_i$ is set to 0.

TABLE 7

|  | Augend ($x_i$) | | |
| --- | --- | --- | --- |
|  | −1 | 0 | 1 |
| Addend ($y_i$) 0 | 1 | 0 | 1 |
| 1 | 0 | 1 | 0 |

TABLE 8

|  | Augend ($x_i$) | | |
| --- | --- | --- | --- |
|  | −1 | 0 | 1 |
| Addend ($y_i$) 0 | 0 | 0 | 1 |
| 1 | 0 | 1 | 1 |

When redundant binary numbers are expressed as binary signals in accordance with Table 6, signal $u_i$ which represents the intermediate sum digit and signal $v_i$ which represents the intermediate carry, can be simplified and determined from the logical equations below.

$$u_i = s_i^a$$

$$v_i = x_i^s \cdot (x_i^a + y_i^a)$$

Signal $s_i^a$, which represents the absolute value of the intermediate sum digit, and the 2-bit signal $z_i^s z_i^a$, which represents the final sum $z_i$, are determined in the same way as in the first embodiment described above.

Figure 2:
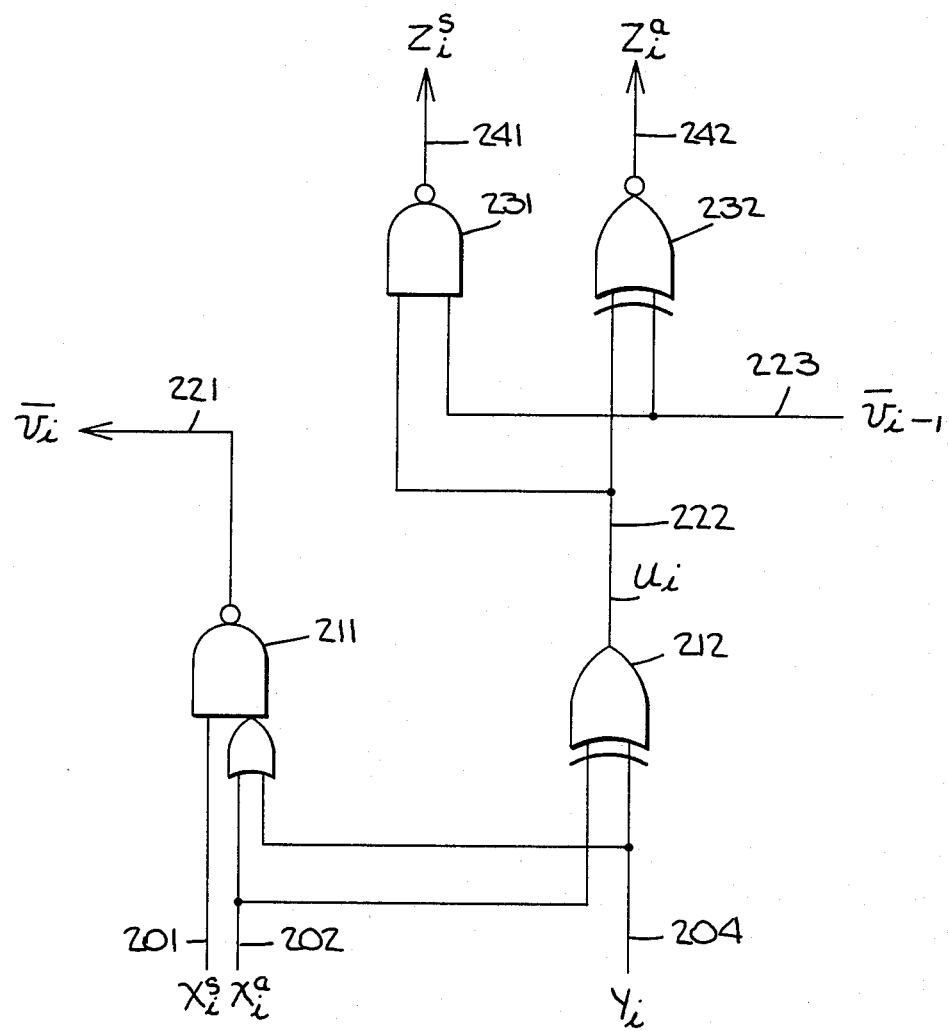
FIG. 2 is a schematic circuit diagram of a second embodiment of an adder according to the invention.
Figure 8:
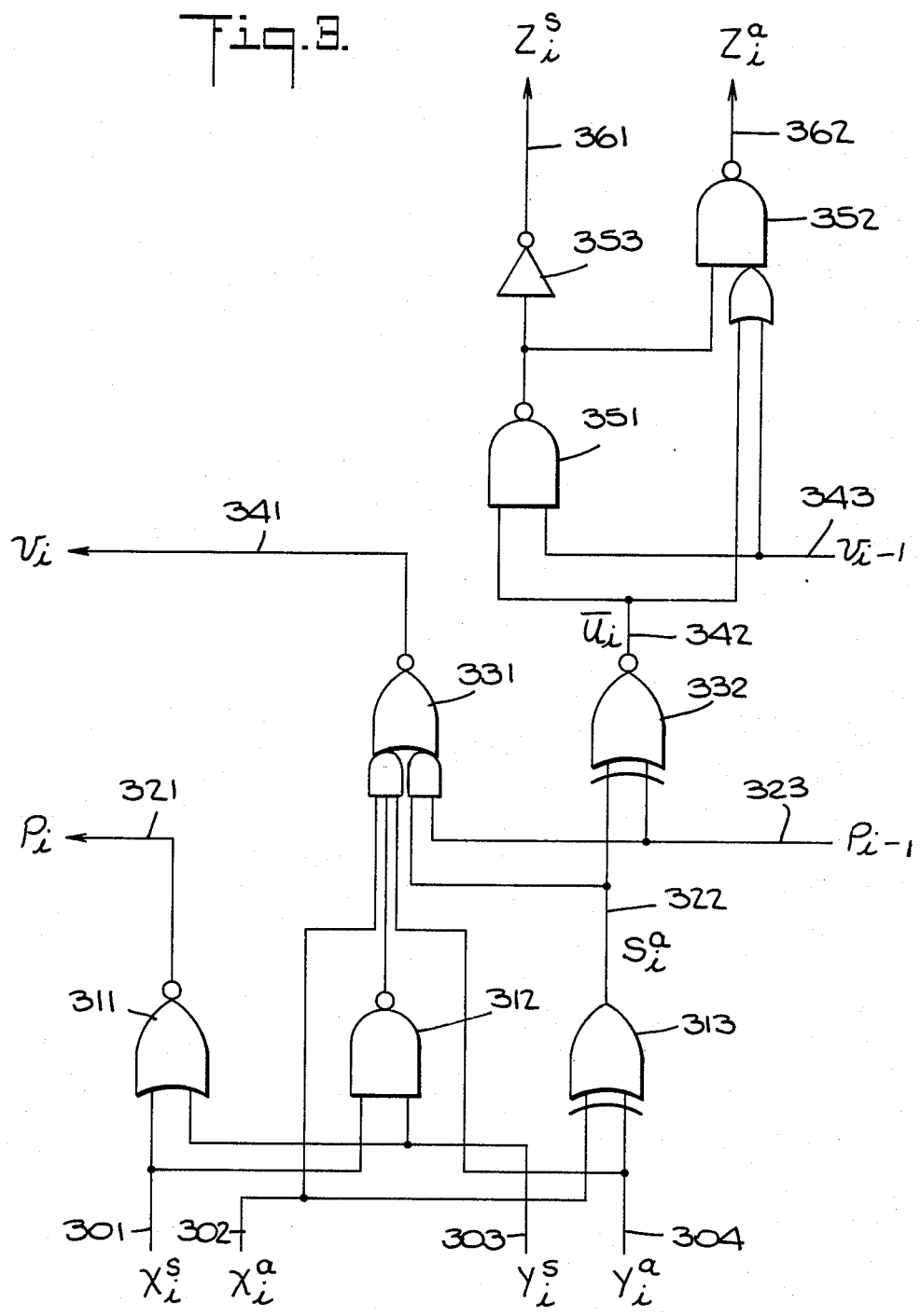

The adder depicted in FIG. 2 carriers out addition between a redundant binary number and a binary number in accordance with the second embodiment of the invention described above.

In FIG. 2: gate 211 is an OR-NAND composite gate; gate 212 is an exclusive OR gate; gate 231 is a NAND gate; and gate 232 is an exclusive NOR gate.

Signals 201 ($x_i^s$), 202 ($x_i^a$), 221 ($\bar{v}_i$), 222 ($u_i$), 223 ($\bar{v}_{i-1}$), 241 ($z_i^s$), and 242 ($z_i^a$) in FIG. 2 are respectively similar to signals 101 ($x_i^s$), 102 ($x_i^a$), 141 ($\bar{v}_i$), 142 ($u_i$), 143 ($\bar{v}_{i-1}$), 161 ($z_i^s$), and 162 ($z_i^a$) in FIG. 1. Signal 204 in FIG. 2 is a 1-bit signal representing the digit $y_i$ at the i-th order position of the addend which is a binary number.

Composite gate 211 determines the logical negation $\bar{v}_1$ (signal 221) of $v_i$ which represents the intermediate carry from the i-th order position. Exclusive OR gate 212 determines $u_i$ (signal 222) which represents the intermediate sum digit. The circuit composed of NAND gate 231 and exclusive NOR gate 232 determines the final sum $z_i^s$ (signal 241) and $z_i^a$ (signal 242) at the i-th order position from $u_i$ (signal 222) representing the intermediate sum digit and the logical negatio ($\bar{v}_{i-1}$ (signal 223) of the signal representing the intermediate carry from the next-lower-order position. The circuit of FIG. 2 is obtained from the circuit of FIG. 1 by setting in FIG. 1, $p_i = 0$, $p_{i-1} = 0$, $y_i^s = 0$ and $y_i^a = y_i$. This enables gates 111 and 132 and the portion of the composite gate 131 receiving signal 123 ($p_{i-1}$) in FIG. 1 to be omitted. Also, OR-NAND composite gate 211 in FIG. 2 replaces gate 113 in FIG. 1 (with signal 201 ($x_1^s$) being supplied to an inverter in composite gate 211); inverter circuit 133 in FIG. 1; composite gate 131 in FIG. 1; and NOR gate 112 in FIG. 1.

Alternatively, redundant binary addition between binary numbers can be performed in the second embodiment by setting the conditions identically as $x_i^s = 1$ and $x_i^a = x_i$. That is, redundant addition between binary numbers $x_i$ and $y_i$ is implemented by replacing the OR-NAND composite gate 211 in FIG. 2 with an exclusive OR gate to which signals 202 and 204 are input.

The first and second embodiments are for the case in which the redundant binary numerals are converted into binary signals according to Table 6 by setting the combination of states status signal $p_i$ of the addend and the augend to 0 when both of the digits at the i-th order position of the augend and addend are nonnegative, and by setting $p_i$ to 1 when at least one of the i-th order position digits is negative. Such conversion can be implemented easily even when these conditions are changed.

According to the third embodiment, which is the reverse of the first embodiment, if the combination of states status signal $p_i$ of the digits at the i-th order position of the addend and the augend is defined as $p_i = 1$ when both of the digits at the i-th order position of the augend and the addend are nonnegative, and is defined as $p_i = 0$ when at least one of the digits is negative, then the intermediate carry $c_{i-1}$ and the intermediate sum digit $x_i$ can be converted into the binary expression $v_{i-1}$ and $u_i$, respectively, by the following equations.

$$u_i = p_{i-1} + s_i$$

$$v_{i-1} = p_{i-1} - c_{i-1}.$$

The addition rule for $u_i$ and $v_i$ is easily determined from Table 1 in the same manner as in the first embodiment. Moreover, redundant binary numbers $x_i$, $y_i$ and $z_i$ are binary-coded as shown in Table 9, for example, "$-1$" is coded to "11", "0" is coded to "00" and "1" is coded to "01".

TABLE 9

| $x_i$ | $x_i^s$ | $x_i^a$ |
|---|---|---|
| −1 | 1 | 1 |
| 0 | 0 | 0 |
| 1 | 0 | 1 |

The combination of states status signal $p_i$ of the digits at the i-th order position of the augend and the addend, the absolute value $s_i^a$ of the intermediate sum digit at the i-th order position, the signal $u_i$ representing an intermediate sum digit and the signal $v_i$ expressing an intermediate carry are determined, respectively, by the logical equations.

$$p_i = x_i^s + y_i^s$$

$$s_i^a = x_i^a \oplus y_i^a$$

$$u_i = s_i^a \oplus p_{i-1}$$

$$v_i = (s_i^a + p_{i-1}) \cdot (x_i^s \cdot y_i^s \cdot x_i^a = y_i^a).$$

The final sum $z_i$ is expressed by a 2-bit signal $z_i^s z_i^a$ which can be determined from the following logical equations.

$$z_i^s = u_i \cdot v_{i-1}$$

$$z_i^a = u_i \oplus v_{i-1},$$

FIG. 3 is a schematic circuit diagram of an adder according to the third embodiment of the invention. In FIG. 3: gate 311 is a NOR gate; gates 312 and 351 are NAND gates; gate 313 is an exclusive OR gate; gate 332 is an exclusive NOR gate; gate 353 is an inverter; gate 331 is an AND-OR composite gate; and gate 352 is an OR-NAND composite gate.

Signals 301 ($x_i^s$), 302 ($x_i^a$), 303 ($y_i^s$), 304 ($y_i^a$), 321 ($p_i$), 332 ($s_i^a$), 323 ($p_{i-1}$), 341 ($v_i$), 342 ($\bar{u}_i$), 343 ($v_{i-1}$), 361 ($z_i^s$) and 362 ($z_i^a$) correspond respectively to signals 101 ($x_i^s$), 102 ($x_i^a$), 103 ($y_i^s$), 104 ($y_i^a$), 121 ($p_i$), 122 ($s_i^a$), 123 ($p_{i-1}$), 141 ($\bar{v}_i$) (the logical negation of $v_i$), 142 ($u_i$) (the logical negation of $\bar{u}_i$), 143 ($\bar{v}_{i-1}$) (the logical negation of $v_{i-1}$), 161 ($z_i^s$) and 162 ($z_i^a$) in FIG. 1.

Other embodiments using addition rules other than the addition rules shown in Table 1 are described next.

Table 10 shows an example of addition rules different from Table 1 in which a carry can propagate no more than 1 digit in redundant binary addition.

TABLE 10

| Augend $x_i$ | Addend $y_i$ | Digit at the next-lower-order position $x_{i-1}, y_{i-1}$ | Carry $c_i$ | Intermediate sum $s_i$ | $p_i$ | $p_{i-1}$ | $v_i$ $p_i - c_i$ | $u_i$ $p_{i-1} + s_i$ |
|---|---|---|---|---|---|---|---|---|
| 1 | 1 | — | 1 | 0 | 1 | 1 | 0 | 1 |
|   |   |   |   |   |   | 0 | 0 | 0 |
| 1 | 0 | $x_{i-1} + y_{i-1} \geq 0$ | 1 | $\bar{1}$ | 1 | 0 | 0 | 0 |
| 0 | 1 | $x_{i-1} + y_{i-1} < 0$ | 1 | 0 | 1 | 0 | 1 | 1 |
| 0 | 0 |   |   |   |   |   |   |   |
| $\bar{1}$ | 1 | — |   |   |   | 1 | 1 | 1 |
| 1 | $\bar{1}$ | — | 0 | 0 | 1 | 0 | 1 | 0 |
| 0 | $\bar{1}$ | $x_{i-1} + y_{i-1} \geq 0$ | 0 | 1 |   | 1 | 0 | 0 |
| $\bar{1}$ | 0 | $x_{i-1} + y_{i-1} < 0$ | $\bar{1}$ | 1 | 0 | 0 | 1 | 1 |
| $\bar{1}$ | $\bar{1}$ | — | $\bar{1}$ | 0 | 0 | 1 | 1 | 1 |
|   |   |   |   |   |   | 0 | 1 | 0 |

($\bar{1}$ denotes $-1$)

In Table 10, an augend $x_i$ and an addend $y_i$ at the i-th order position, and augend $x_{i-1}$ and an addend $y_{i-1}$ at the next-lower-order position, a carry $c_i$ from the i-th order position and an intermediate sum digit $s_i$ are redundant binary numbers and have a value of 1, 0, or $-1$.

As seen in Table 10, the value of the carry $c_i$ and the intermediate sum digit $s_i$ differ in accordance with the values of the augend $x_i$, addend $y_i$, augend $x_{i-1}$ at the next-lower-order position, and the addend $y_{i-1}$ at the next-lower-order position. In Table 10, the values of the intermediate carry $c_i$ and intermediate sum digit $s_i$ also vary with the value of the combination of digits $x_{i-1}$, $y_{i-1}$ at the next-lower-order position. Since the carry $c_i$ and the intermediate sum digit $s_i$ are redundant binary numbers, in order to express these values, two binary variables are needed for each. A binary variable $p_i$ expressing the combination of states of the addend and the augend, that is, whether $x_i + y_i \geq 0$ or $x_i + y_i < 0$, is introduced and defined, for example, as $p_i = 1$ when $x_i + y_i \geq 0$, and as $p_i = 0$ when $x_i + y_i < 0$. In addition, a variable $v_i$ containing carry information $c_i$ and a variable $u_i$ containing intermediate sum digit information $s_i$ are obtained from the combination of states variable $p_i$ at the i-th order position of the augend and the addend, the combination of states variable $p_{i-1}$ at the $(i-1)$-th order position, the carry $c_i$, and the intermediate sum digit $s_i$, where $v_i$ and $u_i$ are expressed by the arithmetic equations.

$$v_i = p_i - c_i \quad (1)$$

$$u_i = p_{i-1} + s_i. \quad (2)$$

By using $\bar{p}_i$ instead of $p_i$, equation (1) can be expressed by $$v_i = p_i + c_i \quad (1_a).$$

That is, $v_i$ and $u_i$ can be generally expressed by linear equations with $p_i$ or $\bar{p}_i$ and $c_i$, and $p_i$ or $\bar{p}_i$ and $s_i$, respectively. In Table 10, the variables $p_i$ and $p_{i-1}$ corresponding to the combinations of the augends and the addends at the i-th and $(i-1)$-th order positions, $v_i$ and $u_i$ are shown. As seen from Table 10, the variable $v_i$ containing carry information and the variable $u_i$ containing intermediate sum digit information are binary variables which have a value of 0 and 1 only.

The final sum $z_i$ at the i-th order position can be obtained from the sum digit of the intermediate sum $s_i$ at the i-th order position and the carry $c_{i-1}$ from the next-lower-order position, that is, the $(i-1)$-th order position, by using equations (1) and (2) as follows.

$$z_i = s_i + c_{i-1} \quad (3)$$
$$= u_i - p_{i-1} - v_{i-1} + p_{i-1}$$
$$= u_i - v_{i-1}$$

Hence the sum $z_i$ at the i-th order position can be obtained from the binary signals $u_i$ and $v_i$.

Next, redundant binary numbers representing the augend $x_i$, the addend $y_i$ and sum $z_i$ are converted into binary of states variables as shown in Table 6. When coding of redundant binary numbers is performed as shown in Table 6, the combination variable $p_i$ of the augend $x_i$ and the addend $y_i$ at the i-th order position, the binary variable $v_i$ containing carry information, the binary variable $u_i$ containing intermediate sum digit information and the final sum $z_i$ at the i-th order position are determined respectively by the logical equations.

$$p_i = x_i^s y_i^s (x_i^a + y_i^a) \quad (4)$$

$$v_i = x_i^s \cdot y_i^a + (x_i^a \oplus y_i^a) \cdot p_{i-1} \quad (5)$$

$$u_i = x_i^a \oplus y_i^a \oplus p_{i-1} \quad (6)$$

$$z_i^s = u_i \cdot v_{i-1} \quad (7)$$

$$z_i^a = u_i \oplus v_{i-1} \quad (8)$$

Figure 4:
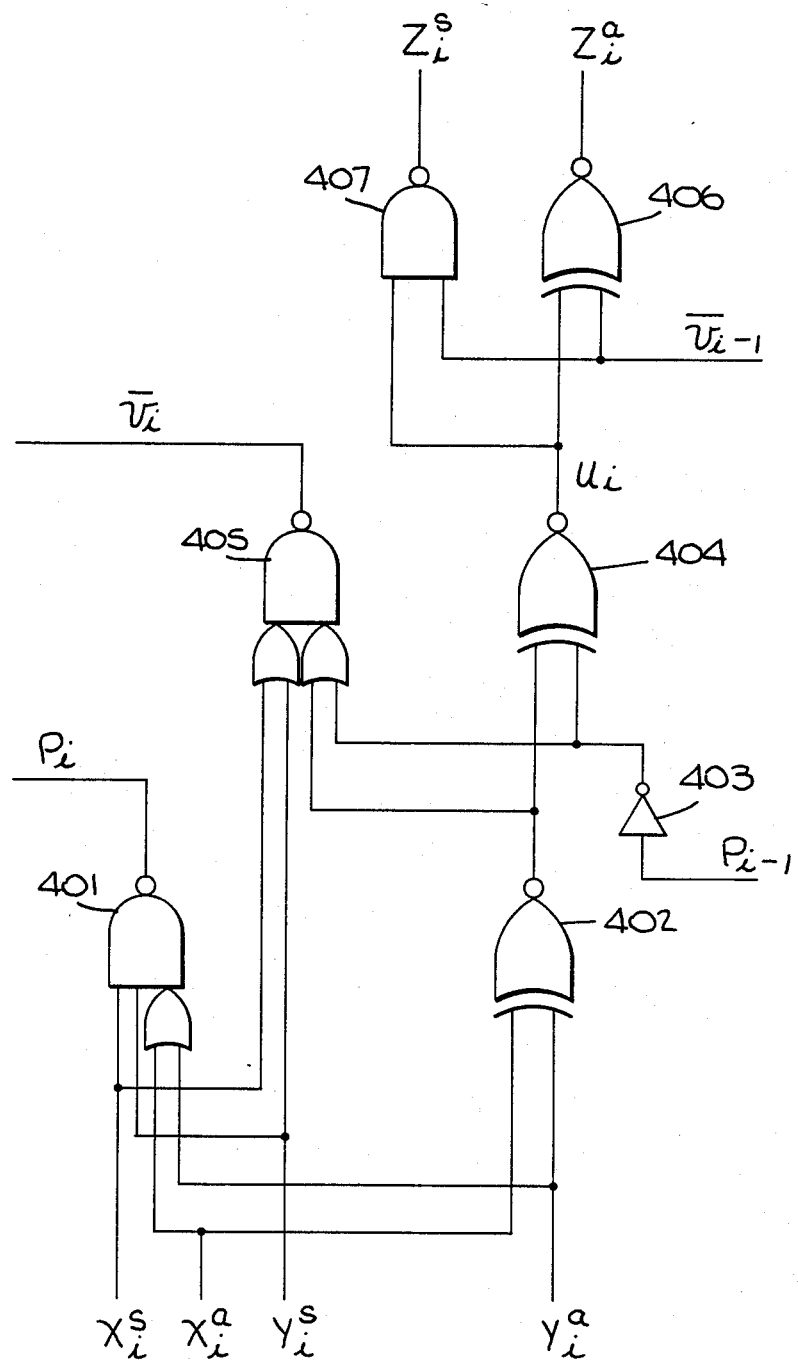
FIG. 4 is a schematic circuit diagram of a fourth embodiment of an adder according to the invention.

Referring now to FIG. 4, it depicts a logical circuit diagram implementing the fourth embodiment of the invention and is constructed according to equations (4) through (8). In FIG. 4: gates 401 and 405 are OR-NAND composite gates; gates 402 and 406 are exclusive NOR gates; gate 403 is an inverter; gate 404 is an exclusive OR gate; and gate 407 is a NAND gate. Input signal $x_i^s$ $x_i^a$, $y_i^s$ $y_i^a$ and output signal $z_i^s$ $z_i^a$ are binary signals expressing redundant binary numbers representing the augend $z_i$, the addend $y_i$ and the final sum $z_i$ at the i-th order position. The output signal $p_i$ and the input signal $p_{i-1}$ are signals showing the combination of states of the augend and the addend at the i-th and $(i-1)$-th order positions, respectively, and each of them is 1 only when the sum of the augend and the addend is nonnegative. The output signal $v_i$ and input signal $v_{i-1}$ contain information of the carry from the i-th and the $(i-1)$-th order positions, respectively. The internal signal $u_i$ contains intermediate sum digit information at the i-th order position.

The fourth embodiment is described for the case of setting the variable $p_i$, which represents the combination of states of the augend and the addend, to 1 when the sum of the augend and the addend is nonnegative, and to 0 when is negative. Other embodiments can be constructed similarly by setting $p_i=1$ when either the augend or the addend is positive and $p_i=0$ when both of them are nonpositive. The addition rule in that case is shown in Table 11, and the variable $v_i$ containing carry information and the variable $u_i$ containing intermediate sum information, which are obtained by equations (1) and (2) described above, have the binary variable values shown in Table 11. At this point, when coding of redundant binary numerals into binary variables is carried out as shown in Table 6 in the same way as described above, the combination variable $p_i$ of the augend $x_i$ and the addend $y_i$ at the i-th order position, the binary variable $v_i$ containing carry information, the binary variable $u_i$ containing intermediate sum digit information and the final sum $z_i$ are expressed by the following equations, respectively.

$$p_i = x_i^s + y_i^s \quad (9)$$

In the fourth and fifth embodiments above, the variable $p_i$ was determined, which expresses the combination of states of the i-th digit of the augend and the i-th digit of the addend, depending on whether the sum of the i-th digit of the augend and the i-th digit of the addend is nonnegative or negative, or whether at least one of the i-th digit of the augend and the i-th digit of the addend is positive or both of them are nonnegative. However, $p_i$ may be set to 1 when both the i-th digit of the augend and the i-th digit of the addend are nonnegative, and $p_i$ may be set to 0 when at least one of the i-th digit of the augend or the i-th digit of the addend is negative. In that case, the logic can be constructed in the same way as in the fourth and fifth embodiments. Furthermore, in the fourth and fifth embodiments, the coding of redundant binary numbers is as follows: 1 is expressed by "01"; "0" is represented by "10"; and "$-1$" is represent by "11" as shown in Table 6. However, other methods of coding are possible and the logic can be constructed in the same way as described for the other embodiments.

TABLE 11

| Augend $x_i$ | Addend $y_i$ | Next-lower-order position $x_{i-1}, y_{i-1}$ | Carry $c_i$ | Intermediate sum $s_i$ | $p_i$ | $p_{i-1}$ | $v_i$ $p_i - c_i$ | $u_i$ $p_{i-1} + s_i$ |
|---|---|---|---|---|---|---|---|---|
| 1 | 1 | — | 1 | 0 | 1 | 1 | 0 | 1 |
|   |   |   |   |   |   | 0 | 0 | 0 |
| 1 | 0 | At least one of them is positive | 1 | $\bar{1}$ |   | 1 | 0 | 0 |
|   |   |   |   |   | 1 |   |   |   |
| 0 | 1 | Both of them are non-positive | 0 | 1 |   | 0 | 1 | 1 |
| $\bar{1}$ | 1 |   |   |   | 1 | 1 | 1 | 1 |
| 1 | $\bar{1}$ | — | 0 | 0 |   | 0 | 1 | 0 |
| 0 | 0 |   |   |   | 0 | 1 | 0 | 1 |
|   |   |   |   |   |   | 0 | 0 | 0 |
| 0 | $\bar{1}$ | At least one of them is positive | 0 | $\bar{1}$ |   | 1 | 0 | 0 |
| $\bar{1}$ | 0 | Both of them are non-positive | $\bar{1}$ | 1 | 0 | 0 | 1 | 1 |
| $\bar{1}$ | $\bar{1}$ | — | $\bar{1}$ | 0 | 0 | 1 | 1 | 1 |
|   |   |   |   |   |   | 0 | 1 | 0 |

($\bar{1}$ denotes $-1$.)

$v_i = x_i^s \cdot y_i^s$
$i^s + x$
$i^a \cdot y$
$i^a + (x_i^a \oplus y_i^a) \cdot p_{i-1}$ (10)
$u_i = x_i^a \oplus y_i^a \oplus p_{i-1}$ (11)
$z_i^s = u_i \cdot v_{i-1}$ (12)
$z_i^a = u_i \oplus v_{i-1}$ (13)

Figure 5:
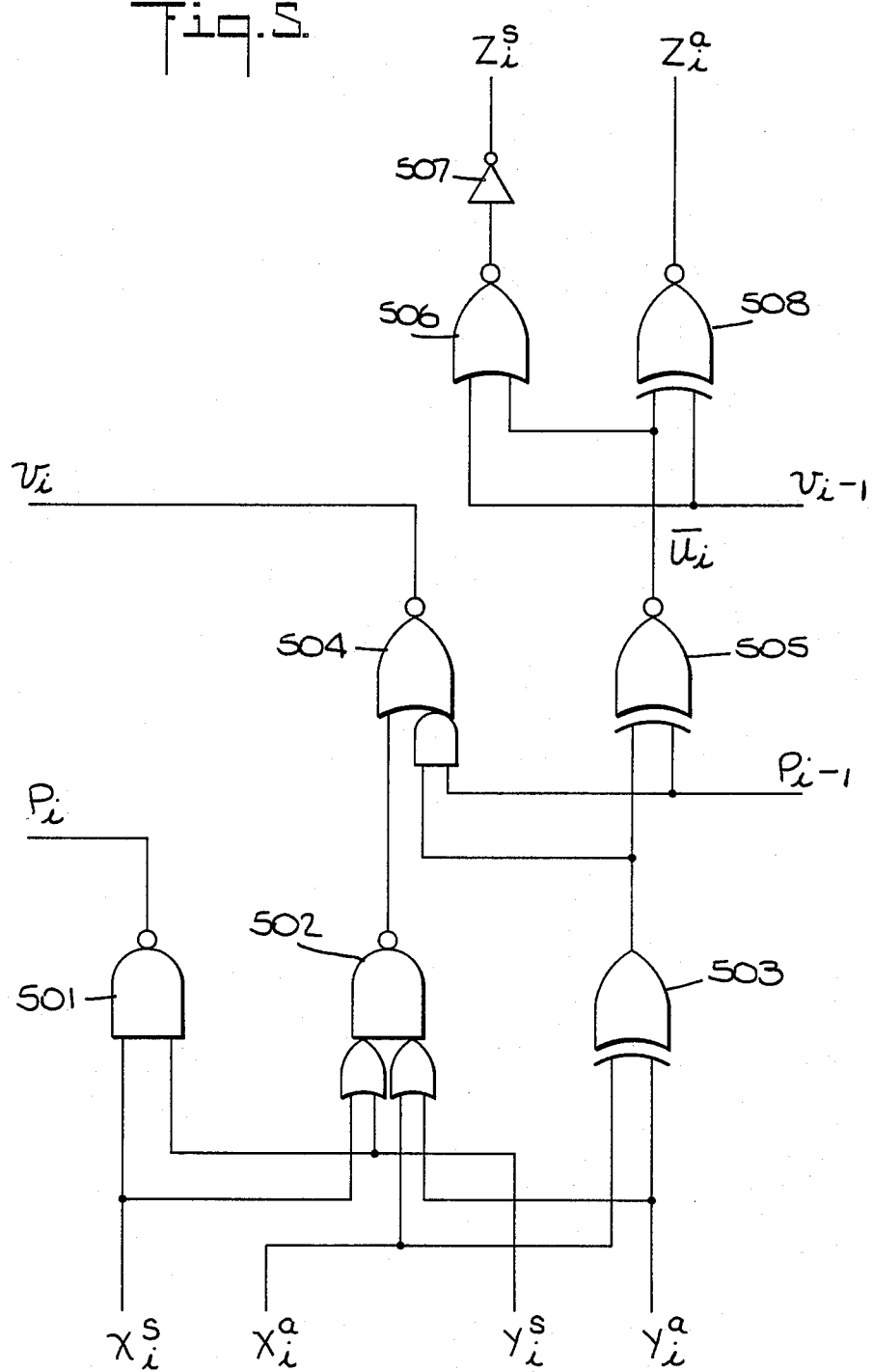
FIG. 5 is a schematic circuit diagram of a fifth embodiment of an adder according to the invention.

In the fifth embodiment, the logic equations are the same as those in the fourth embodiment, except for the logic expressions relating to $p_i$ and $v_i$. FIG. 5 shows a circuit embodiment constructed according to equations (9) to (13). In FIG. 5: gate 501 is a NAND composite gate; gate 502 is an OR-NAND gate; gate 503 is an exclusive OR gate; gate 504 is an AND-NOR composite gate; gates 505 and 508 are exclusive NOR gates; gate 506 is a NOR gate; and gate 507 is an inverter. Output signal $\bar{v}_i$ and input signal $\bar{v}_{i-1}$ in FIG. 4 correspond to $v_i$ and $v_{i-1}$ in FIG. 5, but are inverted. Signal $\bar{u}_i$ in FIG. 5 similarly corresponds to the signal $u_i$ in FIG. 4, but is inverted. Moreover, signals $x_i^s$, $x_i^a$, $y_i^s$, $y_i^a$, $z_i^s$, $z_i^a$, $p_i$ and $p_{i-1}$ correspond to like signals in FIG. 4, respectively.

The circuits implementing the embodiments shown in FIGS. 1, 3, 4 and 5 have about 40 to 44 transistors, with four gate stages in the critical path when using exclusive OR circuits and exclusive NOR circuits having 6 transistors each.

In the embodiments above, redundant addition between redundant binary numbers, and redundant addition between a redundant binary number and a redundant binary number in which all the digits are nonnegative (that is, a binary number) was described. The invention can be easily applied to redundant addition or subtraction between a redundant binary number and a redundant binary number in which all the digits are nonpositive. Although the embodiments described above were implemented by binary logic using CMOS circuits, they can be easily implemented by using other technologies (such as NMOS, ECL, TTL, IIL).

According to the invention, processing time for addition between redundant binary numbers is always four stages long regardless of the number of digits of the numbers, which is shortened by about 1 to 2 gate stages per digit in addition compared with conventional techniques. Moreover, since an addition circuit may be constructed by elements having approximately 42 transistors, the number of elements in a redundant addition unit can be reduced by approximately 20 to 30% compared to a conventional circuit, and circuit construction can be simplified.

According to the invention, using numbers expressed in a signed digit expression, in which each digit has a positive value, zero, or a negative value, for addition and subtraction in arithmetic operations of an arithmetic processor, enables addition or subtraction cells to be realized by simple circuits, and addition and subtraction can be processed in constant time regardless of the number of digits, which provides the following advantages.

(1) The number of gates required in arithmetic processors can be reduced.
(2) A high speed arithmetic processor can be realized.
(3) Circuit construction can be relatively simplified.
(4) Arithmetic processor using LSI can be implemented easily and economically.

In the figures, an exclusive OR gate may be replaced by an exclusive NOR gate and varios combinations of an inverter, a NAND gate may be replaced by a NOR gate and an inverter, a composite gate and an exclusive OR gate may comprise the combination of a NAND gate, a NOR gate or an inverter, and vice versa, etc.

In the claims, unless logical inverses are specifically indicated, where appropriate, reference to a signal encompass the logical inverse of that signal.

What is claimed is:

1. In an arithmetic processor which performs arithmetic operations on radix 2 signed-digit numbers each having N digits denoted by an order index which assumes integer values from 1 to N, said arithmetic processor having a plurality of adder cells each of which performs addition operations on an i-th digit $x_i$ of a signed-digit augend x and an i-th digit $y_i$ of a signed-digit addend y for a different value of the order index i by first determining an intermediate carry digit $c_i$ and an intermediate sum digit $s_i$, and then determining the final sum digit $z_i$ by adding the intermediate sum $s_i$ to an intermediate carry $c_{i-1}$ obtained from the adder cell operating on the next lower order digits, wherein each of said digits of said augend and addend are represented by two one-bit signals respectively representing the sign and magnitude of said digit, said adder cells each comprising:

(a) first circuit means to which are supplied signals representative of said digits $x_i$ and $y_i$, said first circuit means determining therefrom and providing as output a 1-bit signal $p_i$ whose value depends upon the binary states of said digits $x_i$ and $y_i$;

(b) second circuit means to which are supplied at least two signals representative of said digits $x_i$ and $y_i$, and a 1-bit signal $p_{i-1}$ obtained from the first circuit means of the adder cell which operates on the next lower order digits, said second circuit means determining therefrom and providing as output a 1-bit signal $u_i$ representing the difference $p_{i-1} - s_i$;

(c) third circuit means to which are supplied at least two signals representative of said digits $x_i$ and $y_i$ and said signal $p_{i-1}$, said third circuit means determining therefrom and providing as output a 1-bit signal $v_i$ representing the sum $p_i + c_i$; and (d) fourth circuit means to which are supplied as input said signal $u_i$ and a signal $v_{i-1}$ obtained from the third circuit means of the adder cell which operates on the next lower digits, said fourth circuit means determining therefrom and prodiving as output a 2-bit signal representing the sign and magnitude of the i-th digit of the sum of x and y expressed as a radix 2 signed-digit number.

2. The arithmetic processor in accordance with claim 1, wherein said first circuit means is supplied with a 1-bit signal $x_i^s$ and a 1-bit signal $y_i^s$ which represent the sign of digits $x_i$ and $y_i$ respectively and determines therefrom a 1-bit signal $p_i$ whose value depends upon whether digits $x_i$ and $y_i$ are both non-negative, or whether at least one of said digits $x_i$ and $y_i$ is negative.

3. The arithmetic processor according to claim 2 wherein said second circuit means is supplied with two 1-bit signals $x_i^a$ and $y_i^a$ representing the magnitude of said digits $x_i$ and $y_i$ respectively and a 1-bit signal $p_{i-1}$ obtained from the first circuit means of the adder cell which operates on the next lower order digits, said second circuit means determining therefrom and providing as an output a 1-bit signal $u_i$ representing the difference $p_{i-1} - s_i$.

4. The arithmetic processor in accordance with claim 1, wherein said first circuit means is supplied with a 1-bit signal $x_i^s$ and a 1-bit signal $y_i^s$ which represent the sign of digits $x_i$ and $y_i$ respectively and determines therefrom a 1-bit signal $p_i$ whose value depends upon whether digits $x_i$ and $y_i$ are both non-positive or whether at least one of said digits $x_i$ and $y_i$ is positive.

5. The arithmetic processor according to claim 4 wherein said second circuit means is supplied with two 1-bit signals $x_i^a$ and $y_i^a$ representing the magnitude of said digits $x_i$ and $y_i$ respectively and a 1-bit signal $p_{i-1}$ obtained from the first circuit means of the adder cell which operates on the next lower order digits, said second circuit means determining therefrom and providing as an output a 1-bit signal $u_i$ representing the difference $p_{i-1} - s_i$.

6. The arithmetic processor in accordance with claim 1, wherein said first circuit means is supplied with a 1-bit signal $x_i^s$ and a 1-bit signal $y_i^s$ which represent the sign of digits $x_i$ and $y_i$ respectively and determines therefrom a 1-bit signal $p_i$ whose value depends upon whether the sum of the digits $x_i$ and $y_i$ is greater than or equal to zero or whether the sum of the digits $x_i$ and $y_i$ is less than zero.

7. The arithmetic processor according to claim 6 wherein said second circuit means is supplied with two 1-bit signals $x_i^a$ and $y_i^a$ representing the magnitude of said digits $x_i$ and $y_i$ respectively and a 1-bit signal $p_{i-1}$ obtained from the first circuit means of the adder cell which operates on the next lower order digits, said second circuit means determining therefrom and providing as an output a 1-bit signal $u_i$ representing the difference $p_{i-1} - s_i$.

8. The arithmetic processor according to claim 1 wherein said second circuit means is supplied with two 1-bit signals $x_i^a$ and $y_i^a$ representing the magnitude of said digits $x_i$ and $y_i$ respectively and a 1-bit signal $p_{i-1}$ obtained from the first circuit means of the adder cell which operates on the next lower order digits, said second circuit means determining therefrom and providing as an output a 1-bit signal $u_i$ representing the difference $p_{i-1} - s_i$.

9. In an arithmetic processor which performs arithmetic operations on radix 2 signed-digit numbers each having N digits denoted by an order index which assumes integer values from 1 to N, said arithmetic processor having a plurality of adder cells each of which performs addition operations on an i-th digit $x_i$ of a signed-digit augend x and an i-th digit $y_i$ of a signed-digit addend y for a different value of the order index i by first determining an intermediate carry digit $c_i$ and an intermediate sum digit $s_i$, and then determining the final sum digit $z_i$ by adding the intermediate sum $s_i$ to an intermediate carry $c_{i-1}$ obtained from the adder cell operating on the next lower order digits, wherein each of said digits of said augend and addend are represented by two one-bit signals respectively representing the sign and magnitude of said digit, said adder cells each comprising:

(a) first circuit means to which are supplied as inputs a 1-bit signal $x_i^s$ and a 1-bit signal $y_i^s$ which represent the sign of digits $x_i$ and $y_i$ respectively, said first circuit means determining therefrom and providing as output a 1-bit signal $p_i$ whose value depends upon whether both $x_i$ and $y_i$ are non-negative, or whether at least one of said digits $x_i$ and $y_i$ is negative;

(b) second circuit means to which are supplied as input a 1-bit signal $x_i^a$ and a 1-bit signal $y_i^a$ which represent the magnitude of said digits $x_i$ and $y_i$ respectively and a signal $p_{i-1}$ obtained from the first circuit means of the adder cell which operates on the next lower order digits, said second circuit means determining therefrom and providing as output a 1-bit signal $u_i$ representing the difference $p_{i-1} - s_i$;

(c) third circuit means to which are supplied input signals representing the digits $x_i$ and $y_i$ respectively and said signal $p_{i-1}$, said third circuit means determining therefrom and providing as output a 1-bit signal $v_i$ representing the sum $p_i + c_i$; and (d) fourth circuit means to which are supplied as input said 1-bit signal $u_i$ and a 1-bit signal $v_{i-1}$ obtained from the third circuit means of the adder cell which operates on the next lower order digits, said fourth circuit means determining therefrom and providing as output a 2-bit signal representing the sign and magnitude of the i-th ordere digit of the sum of x and y expressed as a radix 2 signed-digit number.

10. In an arithmetic processor which performs arithmetic operations on radix 2 signed-digit numbers each having N digits denoted by an order index which assumed integer values from 1 to N, said arithmetic processor having a plurality of adder cells each of which performs addition operations on an i-th digit $x_i$ of a signed-digit augend x and an i-th digit $y_i$ of a signed-digit addend y for a different value of the order index i by first determining an intermediate carry digit $c_i$ and an intermediate sum digit $s_i$, and then determining the final sum digit $z_i$ by adding the intermediate sum $s_i$ to an intermediate carry $c_{i-1}$ obtained from the adder cell operating on the next lower order digits, wherein each of said digits of said augend and addend are represented by two one-bit signals respectively representing the sign and magnitude of said digit, said adder cells each comprising:

(a) first circuit means to which are supplied signals representative of said digits $x_i$ and $y_i$, said first circuit means determining therefrom and providing as output a 1-bit signal $p_i$ whose value depends upon the binary states of said digits $x_i$ and $y_i$;

(b) second circuit means to which are supplied at least two signals representative of said digits $x_i$ and $y_i$, and a 1-bit signal $p_{i-1}$ obtained from the first circuit means of the adder cell which operates on the next lower order digits, said second circuit means determining therefrom and providing as output a 1-bit signal $u_i$ representing the sum $p_{i-1} + s_i$;

(c) third circuit means to which are supplied at least two signals representative of said digits $x_i$ and $y_i$, and said signal $p_{i-1}$, said third circuit means determining therefrom and providing as output a 1-bit signal $v_i$ representing the difference $p_i - c_i$; and (d) fourth circuit means to which are supplied as input said signal $u_i$ and a signal $v_{i-1}$ obtained from the third circuit means of the adder cell which operates on the next lower digits, said fourth circuit means determining therefrom and providing as output a 2-bit signal representing the sign and magnitude of the i-th digit of the sum of x and y expressed as a radix 2 signed-digit number.

11. The arithmetic processor in accordance with claim 10, wherein said first circuit means is supplied with a 1-bit signal $x_i^s$ and a 1-bit signal $y_i^{ys}$ which represent the sign of digits $x_i$ and $y_i$ respectively and determines therefrom a 1-bit signal $p_i$ whose value depends upon whether digits $x_i$ and $y_i$ are both non-negative, or whether at least one of said digits $x_i$ and $y_i$ is negative.

12. The arithmetic processor according to claim 11 wherein said second circuit means is supplied with two 1-bit signals $x_i^a$ and $y_i^a$ representing the magnitude of said digits $x_i$ and $y_i$ respectively and a 1-bit signal $p_{i-1}$ obtained from the first circuit means of the adder cell which operates on the next lower order digits, said second circuit means determining therefrom and providing as an output a 1-bit signal $u_i$ representing the sum $p_{i-1} + s_i$.

13. The arithmetic processor in accordance with claim 10, wherein said first circuit means is supplied with a 1-bit signal $x_i^s$ and a 1-bit signal $y_i^s$ which represent the sign of digits $x_i$ and $y_i$ respectively and determines therefrom a 1-bit signal $p_i$ whose value depends upon whether digits $x_i$ and $y_i$ are both non-positive or whether at least one of said digits $x_i$ and $y_i$ is positive.

14. The arithmetic processor according to claim 13 wherein said second circuit means is supplied with two 1-bit signals $x_i^a$ and $y_i^a$ representing the magnitude of said digits $x_i$ and $y_i$ respectively and a 1-bit signal $p_{i-1}$ obtained from the first circuit means of the adder cell which operates on the next lower order digits, said second circuit means determining therefrom and providing as an output a 1-bit signal $u_i$ representing the sum $p_{i-1} + s_i$.

15. The arithmetic processor in accordance with claim 10, wherein said first circuit means is supplied with a 1-bit signal $x_i^s$ and a 1-bit signal $y_i^s$ which represent the sign of digits $x_i$ and $y_i$ respectively and determines therefrom a 1-bit signal $p_i$ whose value depends upon whether the sum of the digits $x_i$ and $y_i$ is greater than or equal to zero or whether the sum of the digits $x_i$ and $y_i$ is less than zero.

16. The arithmetic processor according to claim 15 wherein said second circuit means is supplied with two 1-bit signals $x_i^a$ and $y_i^a$ representing the magnitude of said digits $x_i$ and $y_i$ respectively and a 1-bit signal $p_{i-1}$ obtained from the first circuit means of the adder cell which operates on the next lower order digits, said second circuit means determining therefrom and providing as an output a 1-bit signal $u_i$ representing the sum $p_{i-1}+s_i$.

17. The arithmetic processor according to claim 10 wherein said second circuit means is supplied with two 1-bit signals $x_i{}^a$ and $y_i{}^a$ representing the magnitude of said digits $x_i$ and $y_i$ respectively and a 1-bit signal $p_{i-1}$ obtained from the first circuit means of the adder cell which operates on the next lower order digits, said second circuit means determining therefrom and providing as an output a 1-bit signal $u_i$ representing the sum $p_{i-1}+s_i$.

18. In an arithmetic processor which performs arithmetic operations on radix 2 signed-digit numbers each having N digits denoted by an order index which assumed integer values from 1 to N, said arithmetic processor having a plurality of adder cells each of which performs addition operations on an i-th digit $x_i$ of a signed-digit augend x and an i-th digit $y_i$ of a signed-digit addend y for a different value of the order index i by first determining an intermediate carry digit $c_i$ and an intermediate sum digit $s_i$, and then determining the final sum digit $z_i$ by adding the intermediate sum $s_i$ to an intermediate carry $c_{i-1}$ obtained from the adder cell operating on the next lower order digits, wherein each of said digits of said augend and addend are represented by two one-bit signals respectively representing the sign and magnitude of said digit, said adder cells each comprising:

(a) first circuit means to which are supplied as inputs a 1-bit signal $x_i{}^s$ and a 1-bit signal $y_i{}^s$ which represent the sign of digits $x_i$ and $y_i$ respectively, said first circuit means determining therefrom and providing as output therefrom a 1-bit signal $p_i$ whose value depends upon whether both $x_i$ and $y_i$ are non-negative, or whether at least one of said digits $x_i$ and $y_i$ is negative;

(b) second circuit means to which are supplied as input a 1-bit signal $x_i{}^a$ and a 1-bit signal $y_i{}^a$ which represent the magnitude of said digits $x_i$ and $y_i$ respectively and a signal $p_{i-1}$ obtained from the first circuit means of the adder cell which operates on the next lower order digits, said second circuit means determining therefrom and providing as output a 1-bit signal $u_i$ representing the sum $p_{i-1}+p_i$;

(c) third circuit means to which are supplied input signals representing the digits $x_i$ and $y_i$ respectively and said signal $p_{i-1}$, said third circuit means determining therefrom and providing as output a 1-bit signal $v_i$ representing the difference $p_i-c_i$; and (d) fourth circuit means to which are supplied as input said 1-bit signal $u_i$ and a 1-bit signal $v_{i-1}$ obtained from the third circuit means of the adder cell which operates on the next lower digits, said fourth circuit means determining therefrom and providing as output a 2-bit signal representing the sign and magnitude of the i-th order digit of the sum of x and y expressed as a radix 2 signed-digit number.

19. In an arithmetic processor which performs arithmetic operations on radix 2 signed-digit numbers each having N digits denoted by an order index which assumes integer values from 1 to N, said arithmetic processor having a plurality of adder cells each of which performs addition operations on an i-th digit $x_i$ of a signed-digit augend x and an i-th digit $y_i$ of an ordinary binary addend y for a different value of the order index i by first determining an intermediate carry digit $c_i$ and an intermediate sum digit $s_i$, and then determining the final sum digit $z_i$ by adding the intermediate sum $s_i$ to an intermediate carry $c_{i-1}$ obtained from the adder cell operating on the next lower order digits, wherein each of said digits of said augend are represented by two one-bit signals $x_i{}^s$ and $x_i{}^a$ respectively representing the sign and magnitude of said digit and each of said digits of said addend are represented by a 1-bit signal $y_i$, said adder cells each comprising:

(a) first circuit means to which are supplied signals representative of said digits $x_i$ and $y_i$, said first circuit means determining therefrom and providing as output a 1-bit signal $u_i$ representing said intermediate sum digit $s_i$;

(b) second circuit means to which are supplied at the signals representative of said digits $x_i$ and $y_i$, said second circuit means determining therefrom and providing as an output a 1-bit signal $v_i$ representing said intermediate carry $c_i$; and (c) third circuit means to which are supplied as inputs said 1-bit signal $u_i$ and a 1-bit signal $v_{i-1}$ obtained from the second circuit means of the adder cell which operates on the next lower digits, said third circuit means determining therefrom and providing as output a 2-bit signal representing the sign and magnitude of the i-th digit of the sum of x and y expressed as a radix 2 signed-digit number.

20. The arithmetic processor in accordance with claim 19, wherein said first circuit means is supplied with a 1-bit signal $x_i{}^a$ which represents the magnitude of said signed-digit $x_i$ and a 1-bit signal which represents the ordinary binary digit $y_i$, said first circuit means determining therefrom and providing as output a 1-bit signal $u_i$ which represents said intermediate sum digit $s_i$.

* * * * *

UNITED STATES PATENT AND TRADEMARK OFFICE
CERTIFICATE OF CORRECTION

PATENT NO. : 4,866,657
DATED : September 12, 1989
INVENTOR(S) : Tamotsu Nishiyama, et al It is certified that error appears in the above-indentified patent and that said Letters Patent is hereby corrected as shown below:

Col. 1, line 31    "684" should be "683"

Col. 2, line 21    "s" should be "s,"

line 24    "of" should be ") of"

line 24    "s" should be "s,"

line 29    "c" should be "c,"

line 41    "$s_1$" should be "$s_i$"

line 42    "$s_i$" should be "$s_i$;"

line 54    "i-$\ell$)" should be "(i-1)"

line 65    "$(c_i+p_i)$" should be "(or $c_i+\bar{p}_i$)"

Col. 3, line 59    "tion" should be "tes"

UNITED STATES PATENT AND TRADEMARK OFFICE
CERTIFICATE OF CORRECTION

PATENT NO.   :  4,866,657
DATED        :  September 12, 1989
INVENTOR(S)  :  Tamotsu Nishiyama, et al It is certified that error appears in the above-indentified patent and that said Letters Patent is hereby corrected as shown below:

Col. 3, Table 1

| Type | Augend ($x_i$) | Addend ($y_i$) | Next-lower-order position ($x_{i-1}, y_{i-1}$) | Carry ($c_i$) | Intermediate Sum ($s_i$) |
|---|---|---|---|---|---|
| (1) | 1 | 1 | — | 1 | 0 |
| (2) | 1 | 0 | Both are nonnegative | 1 | −1 |
| (3) | 0 | 1 | At least either one is negative | 0 | 1 |
|     | 0 | 0 |   | 0 | 0 |
|     | 1 | −1 |  | 0 | 0 |
| (4) | −1 | 1 | — | 0 | 0 |
| (5) | 0 | −1 | Both are nonnegative | 0 | −1 |
| (6) | −1 | 0 | At least either one is negative | −1 | 1 |
|     | −1 | −1 | — | −1 | 0 | should be

| Type | Augend ($x_i$) | Addend ($y_i$) | Next-lower-order position ($x_{i-1}, y_{i-1}$) | Carry ($c_i$) | Intermediate Sum ($s_i$) |
|---|---|---|---|---|---|
| (1) | 1 | 1 | — | 1 | 0 |
| (2) | 1 | 0 | Both are nonnegative | 1 | −1 |
|     | 0 | 1 | At least either one is negative | 0 | 1 |
| (3) | 0 | 0 |   | 0 | 0 |
|     | 1 | −1 |   | 0 | 0 |
| (4) | −1 | 1 | — | 0 | 0 |
| (5) | 0 | −1 | Both are nonnegative | 0 | −1 |
|     | −1 | 0 | At least either one is negative | −1 | 1 |
| (6) | −1 | −1 | — | −1 | 0 |

UNITED STATES PATENT AND TRADEMARK OFFICE
CERTIFICATE OF CORRECTION

PATENT NO. : 4,866,657  
DATED : September 12, 1989  
INVENTOR(S) : Tamotsu Nishiyama, et al It is certified that error appears in the above-indentified patent and that said Letters Patent is hereby corrected as shown below:

| | | |
|---|---|---|
| Col. 4, | line 26 | "order" should be "other" |
| Col. 5, | line 2 | "of" should be "and" |
| Col. 6, | line 38 | "i.e.)," should be "i.e." |
| | line 39 | "0)." should be "0." |
| | line 42 | "$Y_i$" should be "$y_i$" |
| | line 65 | "digit" should be "digit," |
| | line 66 | "digit sum" should be "sum digit" |
| | Table 3 | all "$p_i$" should be "$\overline{p}_i$" |
| Col. 6, | Table 5 | all "$p_i$" should be "$\overline{p}_i$" |
| Col. 7, | line 1 | "$x_i^s + y_i^s$" should be "$\overline{x}_i^s + \overline{y}_i^s$" |
| | line 5 | "$s_i^a$" should be "$s_i^a$" |
| | line 5 | "$-\lambda$" should be "$-1$" |
| | line 7 | "$s_i^a \cdot p_{i-1}$" should be "$\overline{s_i^a \cdot p_{i-1}}$" |

UNITED STATES PATENT AND TRADEMARK OFFICE
CERTIFICATE OF CORRECTION

PATENT NO. : 4,866,657
DATED : September 12, 1989
INVENTOR(S) : Tamotsu Nishiyama, et al It is certified that error appears in the above-indentified patent and that said Letters Patent is hereby corrected as shown below:

| | | |
|---|---|---|
| | line 13 | "$u_i$" should be "$\bar{u}_i$" |
| | line 13 | "$-\ell$" should be "$-1$" |
| | line 15 | "$-\ell$" should be "$-1$" |
| | line 20 | "$\bar{s}^a_i \cdot p_{i-1}$" should be "$\overline{s^a_i \cdot p_{i-1}}$" |
| | line 62 | "$s^a_i$" should be "$s^a_i$" |
| Col. 8, | line 4 | "$-\ell$" should be "$-1$" |
| | line 6 | "$-\ell$" should be "$-1$" |
| | line 6 | "$= s^a_i$" should be "$= \bar{s}^a_i$" |
| Col. 8, | line 8 | "$s^a_i$ can" should be "$\bar{s}^a_i$ can" |
| | line 20 | "$p_{i-1}$" should be "$\bar{p}_{i-1}$" |
| | line 43 | "$c_{c-1}$" should be "$c_{i-1}$" |
| Col. 9, | line 36 | "negatio" should be "negation" |
| | line 36 | "$(\bar{v}_{i-1}$" should be "$\bar{v}_{i-1}$" |
| | line 44 | "$x^s_i$" should be "$x^S_i$" |

UNITED STATES PATENT AND TRADEMARK OFFICE
CERTIFICATE OF CORRECTION

PATENT NO.  : 4,866,657

DATED       : September 12, 1989

INVENTOR(S) : Tamotsu Nishiyama, et al

It is certified that error appears in the above-indentified patent and that said Letters Patent is hereby corrected as shown below:

Col. 10, line 35  "$x_i^s + y_i^s$" should be "$\overline{x_i^s + y_i^s}$"

line 38  "$\oplus p_{i-\ell}$" should be "$\oplus p_{i-1}$"

line 40  "$s_i^a + p_{i-\ell}$" should be "$\overline{s_i^a} + \overline{p_{i-1}}$"

line 40  "$y_i^s \cdot x_i^a = y_i^a$" should be "$y_i^s + \overline{x_i^a} + \overline{y_i^a}$"

line 45  "$u_i$" should be "$\overline{u}$"

line 57  "332" should be "322"

line 60  "$p_{i-1})$" should be "$(p_{i-1})$"

Col. 11, line 38  "Owhen" should be "0 when"

line 53  "$p_i$" should be "$\overline{p_i}$"

UNITED STATES PATENT AND TRADEMARK OFFICE
CERTIFICATE OF CORRECTION

PATENT NO. : 4,866,657

DATED : September 12, 1989

INVENTOR(S) : Tamotsu Nishiyama, et al

It is certified that error appears in the above-indentified patent and that said Letters Patent is hereby corrected as shown below:

Col. 11, Table 10

| Augend $x_i$ | Addend $y_i$ | Digit at the next-lower-order position $x_{i-1}, y_{i-1}$ | Carry $c_i$ | Intermediate sum $s_i$ | $p_i$ | $p_{i-1}$ | $v_i$ $p_i - c_i$ | $u_i$ $p_{i-1} + s_i$ |
|---|---|---|---|---|---|---|---|---|
| 1 | 1 | — | 1 | 0 | 1 | 1 | 0 | 1 |
|   |   |   |   |   |   | 0 | 0 | 0 |
| 1 | 0 | $x_{i-1} + y_{i-1} \geqq 0$ | 1 | $\bar{1}$ |   | 1 | 0 | 0 |
| 0 | 1 | $x_{i-1} + y_{i-1} < 0$ | 1 | 0 | 1 | 0 | 1 | 1 |
| 0 | $\underline{0}$ |   |   |   |   |   |   |   |
| $\underline{1}$ | 1 |   |   |   |   | 1 | 1 | 1 |
| $\bar{1}$ | $\underline{1}$ | — | 0 | $\underline{0}$ | 1 | 0 | 1 | 0 |
| $\underline{0}$ | 1 | $x_{i-1} + y_{i-1} \geqq 0$ | $\underline{0}$ | $\bar{1}$ |   | 1 | 0 | 0 |
| $\underline{1}$ | 0 | $x_{i-1} + y_{i-1} < 0$ | $\underline{1}$ | 1 | 0 | 0 | 1 | 1 |
| $\bar{1}$ | $\bar{1}$ | — | $\bar{1}$ | 0 | 0 | 1 | 1 | 1 |
|   |   |   |   |   |   | 0 | 1 | 0 |

($\bar{1}$ denotes $-1$)

should be

| Augend $x_i$ | Addend $y_i$ | Digit at the next-lower-order position $x_{i-1}, y_{i-1}$ | Carry $c_i$ | Intermediate sum $s_i$ | $p_i$ | $p_{i-1}$ | $v_i$ $p_i - c_i$ | $u_i$ $p_{i-1} + s_i$ |
|---|---|---|---|---|---|---|---|---|
| 1 | 1 | — | 1 | 0 | 1 | 1 | 0 | 1 |
|   |   |   |   |   |   | 0 | 0 | 0 |
| 1 | 0 | $x_{i-1} + y_{i-1} \geqq 0$ | 1 | $\bar{1}$ |   | 1 | 0 | 0 |
| 0 | 1 | $x_{i-1} + y_{i-1} < 0$ | 0 | 1 | 1 | 0 | 1 | 1 |
| 0 | $\underline{0}$ |   |   |   | 1 | 1 | 1 |   |
| 1 | 1 | — | 0 | 0 | 1 |   |   |   |
| $\bar{1}$ | $\bar{1}$ |   |   |   |   | 0 | 1 | 0 |
| $\underline{0}$ | 1 | $x_{i-1} + y_{i-1} \geqq 0$ | $\underline{0}$ | $\bar{1}$ | $\bar{0}$ | 1 | 0 | 0 |
| $\underline{1}$ | 0 | $x_{i-1} + y_{i-1} < 0$ | $\underline{1}$ | 1 | 0 | 0 | 1 | 1 |
| $\bar{1}$ | $\bar{1}$ | — | $\bar{1}$ | 0 | 0 | 1 | 1 | 1 |
|   |   |   |   |   |   | 0 | 1 | 0 |

UNITED STATES PATENT AND TRADEMARK OFFICE
CERTIFICATE OF CORRECTION

PATENT NO. : 4,866,657
DATED : September 12, 1989
INVENTOR(S) : Tamotsu Nishiyama, et al It is certified that error appears in the above-indentified patent and that said Letters Patent is hereby corrected as shown below:

Col. 12, line 19     "$-\ell$" should be "$-1$"

line 20     "$-\ell$" should be "$-1$"

line 21     "$-\ell$" should be "$-1$"

line 28     "Table 6" should be "Table 12"

line 30     "Table 6" should be "Table 12"

line 37     "$x_i^s y_i^s (x_i^a + y_i^a)$" should be "$\overline{x_i^s y_i^s (x_i^a + y_i^a)}$"

line 39     "$x_i^s \cdot y_i^s + (x_i^a \oplus y_i^a) \cdot p_{i-1}$" should be "$\overline{x_i^s \cdot y_i^s} + \overline{(x_i^a \oplus y_i^a) \cdot p_{i-1}}$"

line 39     "$x_i^s \cdot y_i^a + (x_i^a \oplus y_i^a) \cdot p_{i-1}$" should be "$\overline{x_i^s \cdot y_i^s} + \overline{(x_i^a \oplus y_i^a) \cdot p_{i-1}}$"

line 40     "$-\ell$" should be "$-1$"

line 42     "$u_i \cdot v_{i-1}$" should be "$\overline{u_i \cdot \overline{v}_{i-1}}$"

line 42     "$z_i$" should be "$z_i^s$"

line 44     "$z_i$" should be "$z_i^a$"

line 44     "$u_i \oplus v_{i-1}$" should be "$\overline{u_i \oplus \overline{v}_{i-1}}$"

UNITED STATES PATENT AND TRADEMARK OFFICE
CERTIFICATE OF CORRECTION

PATENT NO. : 4,866,657

DATED : September 12, 1989

INVENTOR(S) : Tamotsu Nishiyama, et al

It is certified that error appears in the above-indentified patent and that said Letters Patent is hereby corrected as shown below:

Col. 13, line 12   "Table 6" should be "Table 12"

line 20   "$x_i^s + y_i^s$" should be "$\bar{x}_i^s + \bar{y}_i^s$"

lines 46-50 which read as follows

"$v_i = \bar{x}$"

"$\bar{i}^s \cdot y$"

"$\bar{i}^s + x$"

"$\bar{i}^a \cdot y$"

"$\bar{i}^a + (x_i^s \oplus y_i^s) \cdot p_{i-1}$"

should be

"$v_i = \bar{x}_i^s \cdot \bar{y}_i^s + \bar{x}_i^a \cdot \bar{y}_i^a + (x_i^a \oplus y_i^a) \cdot p_{i-1}$"

line 51   "$u_i = {_x}_i^a$" should be "$u_i = x_i^a$"

line 52   "$u_i \cdot v_{i-1}$" should be "$\overline{u_i \cdot \bar{v}_{i-1}}$"

line 53   "$u_i \oplus v_{i-1}$" should be "$\overline{u_i \oplus \bar{v}_{i-1}}$"

UNITED STATES PATENT AND TRADEMARK OFFICE
CERTIFICATE OF CORRECTION

PATENT NO. : 4,866,657
DATED : September 12, 1989
INVENTOR(S) : Tamotsu Nishiyama, et al It is certified that error appears in the above-indentified patent and that said Letters Patent is hereby corrected as shown below:

Col. 13, Table 11

| Augend $x_i$ | Addend $y_i$ | Next-lower-order position $x_{i-1}, y_{i-1}$ | Carry $c_i$ | Intermediate sum $s_i$ | $p_i$ | $p_{i-1}$ | $v_i$ $p_i - c_i$ | $u_i$ $p_{i-1} + s_i$ |
|---|---|---|---|---|---|---|---|---|
| 1 | 1 | — | 1 | 0 | 1 | 1 | 0 | 1 |
| | | | | | | 0 | 0 | 0 |
| 1 | 0 | At least one of them is positive | 1 | $\bar{1}$ | | 1 | 0 | 0 |
| 0 | 1 | Both of them are non-positive | 0 | 1 | 1 | 0 | 1 | 1 |
| $\bar{1}$ | $\bar{1}$ | — | 0 | 0 | 1 | 1 | 1 | 1 |
| | 1 | | | | | 0 | 1 | 0 |
| 0 | 0 | | | | 0 | 1 | 0 | 1 |
| | | | | | | 0 | 0 | 0 |
| 0 | $\bar{1}$ | At least one of them is positive | 0 | $\bar{1}$ | | 1 | 0 | 0 |
| $\bar{1}$ | 0 | Both of them are non-positive | $\bar{1}$ | 1 | 0 | 0 | 1 | 1 |
| $\bar{1}$ | $\bar{1}$ | — | $\bar{1}$ | 0 | 0 | 1 | 1 | 1 |
| | | | | | | 0 | 1 | 0 | should be

UNITED STATES PATENT AND TRADEMARK OFFICE
CERTIFICATE OF CORRECTION

PATENT NO. : 4,866,657
DATED : September 12, 1989
INVENTOR(S) : Tamotsu Nishiyama, et al It is certified that error appears in the above-indentified patent and that said Letters Patent is hereby corrected as shown below:

Col. 13, Table 11 should be

| Augend $x_i$ | Addend $y_i$ | Next-lower-order position $x_{i-1}, y_{i-1}$ | Carry $c_i$ | Intermediate sum $s_i$ | $p_i$ | $p_{i-1}$ | $p_i - c_i$ | $p_{i-1} + s_i$ |
|---|---|---|---|---|---|---|---|---|
| 1 | 1 | — | 1 | 0 | 1 | 1 / 0 | 0 / 0 | 1 / 0 |
| 1 | 0 | At least one of them is positive | 1 | 1 | 1 | 1 | 0 | 0 |
| 0 | 1 | Both of them are non-positive | 0 | 1 | | 0 | 1 | 1 |
| 1 | 1 | — | 0 | 0 | 1 | 1 / 0 | 1 / 1 | 1 / 0 |
| 0 | 0 | | 0 | 0 | 0 | 1 / 0 | 0 / 0 | 1 / 0 |
| 0 | 1 | At least one of them is positive | 0 | 1 | 0 | 1 | 0 | 0 |
| 1 | 0 | Both of them are non-positive | 1 | 1 | | 0 | 0 | 1 | 1 |
| 1 | 1 | — | 1 | 0 | 0 | 1 / 0 | 1 / 1 | 1 / 0 |

UNITED STATES PATENT AND TRADEMARK OFFICE
CERTIFICATE OF CORRECTION

PATENT NO. : 4,866,657

DATED : September 12, 1989

INVENTOR(S) : Tamotsu Nishiyama, et al

It is certified that error appears in the above-indentified patent and that said Letters Patent is hereby corrected as shown below:

Col. 14, line 4     "sume" should be "sum"

line 18     "represent" should be "represented"; "Table 6" should be "Table 12"

line 25     Add Table 12 as follows

| $x_i$ | $x_i^s$ | $x_i^a$ |
|---|---|---|
| -1 | 1 | 1 |
| 0 | 1 | 0 |
| 1 | 0 | 1 |

UNITED STATES PATENT AND TRADEMARK OFFICE
CERTIFICATE OF CORRECTION

PATENT NO. : 4,866,657
DATED : September 12, 1989
INVENTOR(S) : Tamotsu Nishiyama, et al It is certified that error appears in the above-indentified patent and that said Letters Patent is hereby corrected as shown below:

Col. 15, line 31   "varios" should be "various"

Col. 17, line 49   "ordere" should be "order"

Col. 18, line 28   "$y_i^{rs}$" should be "$y_i^s$"

Col. 19, line 52   "$+p_i$" should be "$+s_i$"

Col. 20, line 6    "lower digits" should be "lower order digits"

Signed and Sealed this

Sixth Day of June, 1995

Attest:

BRUCE LEHMAN

*Attesting Officer*       *Commissioner of Patents and Trademarks*